(12) United States Patent
Nelson et al.

(10) Patent No.: US 8,512,091 B2
(45) Date of Patent: Aug. 20, 2013

(54) VALVE AND RETAINER ASSEMBLY FOR LATEX BALLOONS

(75) Inventors: David C. Nelson, Akron, OH (US); Martin A. Meluch, Newton Falls, OH (US)

(73) Assignee: Premium Balloon Accessories, Inc., Sharon Center, OH (US)

( * ) Notice: Subject to any disclaimer, the term of this patent is extended or adjusted under 35 U.S.C. 154(b) by 2334 days.

(21) Appl. No.: 11/042,627

(22) Filed: Jan. 24, 2005

(65) Prior Publication Data

US 2006/0166594 A1   Jul. 27, 2006

(51) Int. Cl.
  *A63H 3/06*   (2006.01)
(52) U.S. Cl.
  USPC .......................................... 446/224; 446/220
(58) Field of Classification Search
  USPC ................................. 446/220–226
  See application file for complete search history.

(56) References Cited

U.S. PATENT DOCUMENTS

| | | | | |
|---|---|---|---|---|
| 1,300,640 A * | 4/1919 | Pasternak | ...................... | 446/220 |
| 2,150,648 A * | 3/1939 | Ernst Eger | ..................... | 137/872 |
| 2,161,274 A * | 6/1939 | Behrend | ....................... | 446/224 |
| 2,202,896 A | 6/1940 | Buchner et al. | | |
| 2,540,403 A * | 2/1951 | Myers | ........................... | 446/221 |
| 2,635,387 A * | 4/1953 | Anderson | ..................... | 446/221 |
| 3,154,050 A | 10/1964 | Hanson | | |
| 3,871,422 A | 3/1975 | Elson | ........................... | 137/231 |
| 3,949,984 A * | 4/1976 | Navara | .......................... | 446/220 |
| 4,004,614 A | 1/1977 | Mackal et al. | ................ | 138/89.2 |
| 4,142,322 A * | 3/1979 | Zeyra | ........................... | 446/224 |
| 4,167,204 A | 9/1979 | Zeyra | ............................. | 141/348 |
| 4,681,138 A | 7/1987 | Giuliani | .................... | 137/516.29 |
| 4,701,148 A | 10/1987 | Cotey | ............................ | 446/224 |
| 4,750,314 A | 6/1988 | Mietz et al. | ...................... | 53/470 |
| 4,873,976 A | 10/1989 | Schreiber | ...................... | 128/334 |
| 4,895,545 A | 1/1990 | Nelson | .......................... | 446/220 |
| 4,911,674 A | 3/1990 | Cole | ............................. | 446/224 |
| 4,994,073 A | 2/1991 | Green | .......................... | 606/220 |
| 5,108,339 A * | 4/1992 | Kieves | ......................... | 446/221 |
| 5,245,991 A | 9/1993 | Kawaguchi | .................. | 128/200 |
| 5,496,203 A | 3/1996 | Murray | ........................ | 446/222 |
| 5,499,941 A | 3/1996 | Penjuke | ....................... | 446/222 |
| 5,732,530 A * | 3/1998 | Pfaff | ............................. | 53/403 |
| 5,944,576 A | 8/1999 | Nelson et al. | ................. | 446/220 |
| 6,314,984 B1 | 11/2001 | Barriendos et al. | ........... | 137/223 |
| 6,430,804 B1 | 8/2002 | Nelson et al. | .................. | 29/566 |
| 6,622,759 B2 * | 9/2003 | Yang | ............................. | 446/224 |
| 6,790,120 B1 * | 9/2004 | Murray | ......................... | 446/220 |
| 6,814,644 B2 | 11/2004 | Nelson et al. | ................. | 446/224 |

FOREIGN PATENT DOCUMENTS

DE     43 43 139        5/1995
GB     2047 850 A       12/1979

* cited by examiner

*Primary Examiner* — Gene Kim
*Assistant Examiner* — Urszula M Cegielnik
(74) *Attorney, Agent, or Firm* — Renner Kenner Greive Bobak Taylor & Weber

(57) ABSTRACT

A valve and retainer assembly particularly useful for latex balloons includes a valve body and a band valve. The valve body has a radial shoulder where the neck and mouth of a latex balloon may be received to affix the balloon to the valve body. A hollow stem communicates with the radial shoulder, and a one-way valve allows gas to be introduced through the stem into the balloon affixed to the retainer portion. A valve and retainer for filling first and second balloons further includes a slide disk having a seal sleeve that intimately fits over the stem portion, such that the sealing slide disk selectively slides along the stem portion so that the seal sleeve can selectively cover the at least one second balloon fill aperture; and a flexible band covering the at least one fill aperture of the fill portion.

10 Claims, 2 Drawing Sheets

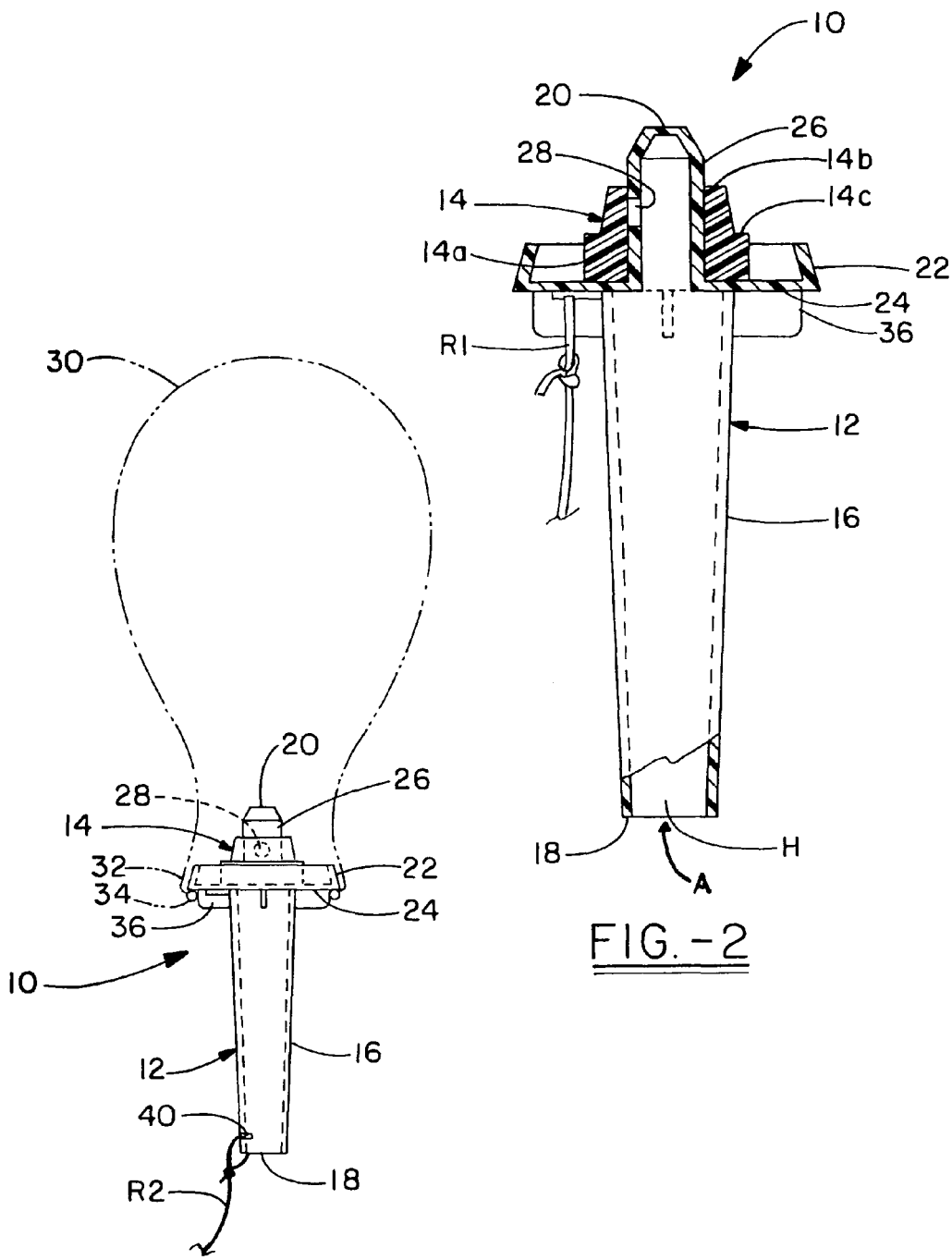

VALVE AND RETAINER ASSEMBLY FOR LATEX BALLOONS

BACKGROUND OF THE INVENTION

The present invention generally resides in the art of balloon devices and accessories. More particularly, the present invention relates to a valve and retainer assembly for a latex balloon, and its method of use.

The use of latex balloons as decorations for parties, celebrations, grand openings, and other events is well known, and millions of balloons are so used each year. At many of these events, a substantially large number of latex balloons are decoratively employed, and, many times, the latex balloons are printed with indicia that is particular to the specific event. In such cases, the balloons are special ordered, at significant expense. Decorating the event may also entail a significant expense inasmuch as a great amount of time and effort is required to fill these latex balloons and affix them to ribbons or balloon sticks, for display at the event. Thus, manufacturers involved with providing such balloons have endeavored to provide latex balloons with valves that avoid the need for tying balloon necks to retain gas therein, and increase the rate at which these balloons might be filled with gas and attached to ribbons or sticks, as desired. The prior art valve and retainer assemblies, however, are quite complex, and are undesirably difficult to manufacture, assemble, and use. It has also been found that some valve designs suffer from creating too much noise during inflation of a balloon. Thus, there is a need in the art for a valve and retainer assembly that is easy to manufacture, assemble and use in filling latex balloons, and the art would further benefit from a valve that allows for a relatively quiet inflation of a balloon.

It is becoming popular to provide decorative balloon displays consisting of a first balloon, usually of a bright color and oftentimes printed with event-specific indicia, filled within the interior of a second balloon that is usually transparent so that one may view the interior first balloon. Glitter, ribbons and little gifts may also be retained within the second, exterior balloon. These balloon displays may be referred to herein as balloon-within-balloon displays, and it is believed that their popularity will grow as new efficient means for their production are devised.

Because balloon-within-balloon displays are unique products, they typically have to be special ordered, at significant expense, although standard balloon-within-balloon displays of a generic nature might be provided for mass retail sales. Decorating an event with such displays may also entail a significant expense inasmuch as a great amount of time and effort is required to fill the balloon-within-balloon displays and affix them to ribbons or balloon sticks, for display at the event. Thus, manufacturers involved with providing such displays have begun to consider the construction of valves that avoid the need for individually tying both balloons within the display, and increase the rate at which these displays might be filled with gas and attached to ribbons or sticks, as desired. There is a need in the art for a valve and retainer assembly that is easy to manufacture, assemble, and use in filling balloon-within-balloon displays.

When valves are employed, their weight affects the lift factor of helium (or other lighter-than-air) balloons. Also, valves might alter the balance of a balloon as it floats at the end of a ribbon. Thus, when a valve and retainer assembly is provided for a helium balloon, it should have a minimal impact on the lift factor of the balloon, and should allow the balloon to be attached to a ribbon without significantly altering the orientation at which the balloon floats. The valves should be easy to inflate, and require low pressures to force the inflation gas past the valve and into the balloon at a relatively low noise level.

SUMMARY OF THE INVENTION

In one embodiment, the present invention provides a valve and retainer assembly for a balloon including a valve body and a band valve. The valve body includes a stem portion that is hollow from an open first end to a closed second end thereof, and a radial shoulder that extends outwardly from a position recessed from the second end of the stem potion, thereby defining a fill portion of the stem as the portion of the stem that extends beyond the radial shoulder to the closed second end, the fill portion including at least one fill aperture communicating with the hollow of the stem. The band valve is a flexible band that covers the at least one fill aperture of the fill portion.

To use such a valve and retainer assembly, the mouth of a latex balloon, which is typically defined by a rolled portion of balloon material, is stretched over the radial shoulder such that the fill portion of the stem extends into the interior of the balloon. In this configuration, gas pressure applied through the hollow of the stem can only escape the stem through the at least one fill aperture, and, thus, will cause the flexible band valve to flex to allow gas to flow from the hollow of the stem through the fill portion and out the at least one fill aperture therein. When a balloon is fixed to the valve and retainer assembly as just described, gas flowing through the hollow of the stem will fill the balloon. When the flow of gas is stopped the band valve reverts to covering the at least one fill aperture to prevent gas from flowing out from the balloon into the hollow of the stem. Thus, the band valve is a one-way valve that allows a balloon affixed to the valve and retainer assembly to be filled with gas and sealed, without tying the neck of the balloon. This significantly increases the speed at which multiple latex balloons might be filled from a pressurized gas source and, thereafter, employed to decorate a particular event.

It is envisioned that entities desiring to employ a great number of balloons in decorating an event would desire to have the valve and retainer assemblies of this invention provided with balloons and/or ribbons or balloon sticks affixed thereto, while the balloon is in an deflated state, such that mass quantities of deflated balloons could be provided to such an end consumer, who, upon receipt, could easily inflate the balloons and decorate the event. With this understanding in mind, the present invention also provides, in combination, a balloon and a valve and retainer assembly for a balloon comprising a balloon including a neck portion having a mouth defined by a rolled portion of balloon material; and a valve and retainer assembly including a valve body and a band valve. The valve body includes a stem portion that is hollow from an open first end to a closed second end thereof, and a radial shoulder that extends outwardly from a position recessed from the second end of the stem, thereby defining a fill portion of the stem as the portion of the stem that extends beyond the radial shoulder to the closed second end. The fill portion includes at least one fill aperture communicating with the hollow of the stem. The band valve is a flexible band that covers the at least one fill aperture of the fill portion. To join the balloon and the valve and retainer assembly, the rolled portion of balloon material defining the mouth is received around the radial shoulder such that the fill portion extends into the interior of the balloon.

In another embodiment, this invention provides a valve and retainer assembly for filling first and second balloons, wherein the first balloon is inside of the second balloon. The assembly includes a valve body, a slide disk and a band valve. The valve body includes a stem portion that is hollow from an open first end to a closed second end thereof, and a radial shoulder that extends outwardly from a position recessed from the second end of the stem potion, thereby defining a fill portion of the stem as the portion of the stem that extends beyond the radial shoulder to the closed second end, the fill portion including at least one first balloon fill aperture communicating with the hollow of the stem. The band valve is a flexible band that covers the at least one first balloon fill aperture of the fill portion. At least one second balloon fill aperture extends through the stem portion, below the radial shoulder, and into the hollow of the stem portion. The slide disk has a seal sleeve that intimately fits over the stem portion, such that the slide disk selectively slides along the stem portion so that the seal sleeve can selectively cover the at least one second balloon fill aperture. The band valve is a flexible band that covers the at least one first balloon fill aperture of the fill portion.

To use the valve and retainer assembly, the mouth of a first balloon, which is typically defined by a rolled portion of balloon material, is stretched over the perimeter of the radial shoulder. Then the mouth of a second balloon is stretched over the perimeter of the slide disk such that the first balloon is located inside of the second balloon. The slide disk is moved along the stem portion so that its seal sleeve does not cover the at least one second balloon fill aperture in the stem portion, and the at least one second balloon fill aperture communicates with the interior of the second balloon. Gas, typically helium, is forced through the hollow of the stem portion and enters the second balloon by way of the at least one second balloon fill aperture. The configuration of the valve and retainer assembly is such that, when the at least one second balloon fill aperture is uncovered, gas introduced through the hollow of the stem portion exits the hollow at the at least one second balloon fill aperture, as this is the path of least resistance for the gas. The gas does not force the band valve off of the at least one first balloon fill aperture in the fill portion. After the second, exterior balloon is filled to a desired extent, the slide disk is moved so that its seal sleeve covers the at least one second balloon fill aperture in the stem portion, and, thereafter, gas introduced to the hollow of the stem portion pushes against the band valve through the at least one first balloon fill aperture, causing the band valve to flex to allow gas to flow from the hollow of the stem portion, through the at least one first balloon fill aperture, to fill the first balloon inside of the second balloon. Thus, the slide disk acts as a valve that can be selectively manipulated to cover or uncover the at least one second balloon fill aperture to have it selectively communicate with the interior of the second exterior balloon. This valve assembly significantly increases the speed at which balloon-within-balloon displays might be filled from a pressurized gas source and, thereafter, employed to decorate a particular event.

It is envisioned that entities desiring to employ a great number of balloon-within-balloon displays in decorating an event would desire to have the valve and retainer assemblies of this invention provided with balloons and/or ribbons or balloon sticks affixed thereto, while the two balloons associated therewith are in an un-inflated state, such that mass quantities of uninflated balloon-within-balloon display could be provided to such an end consumer, who, upon receipt, could easily inflate them and decorate the event.

DESCRIPTION OF THE DRAWINGS

FIG. 1 is a side elevational view illustrating the application of the invention for inflation of a single balloon, the balloon being illustrated as uninflated;

FIG. 2 is a greatly enlarged elevational view, in partial section, illustrating the valve device of the invention;

PREFERRED EMBODIMENT FOR CARRYING OUT THE INVENTION

Figures 3, 4:
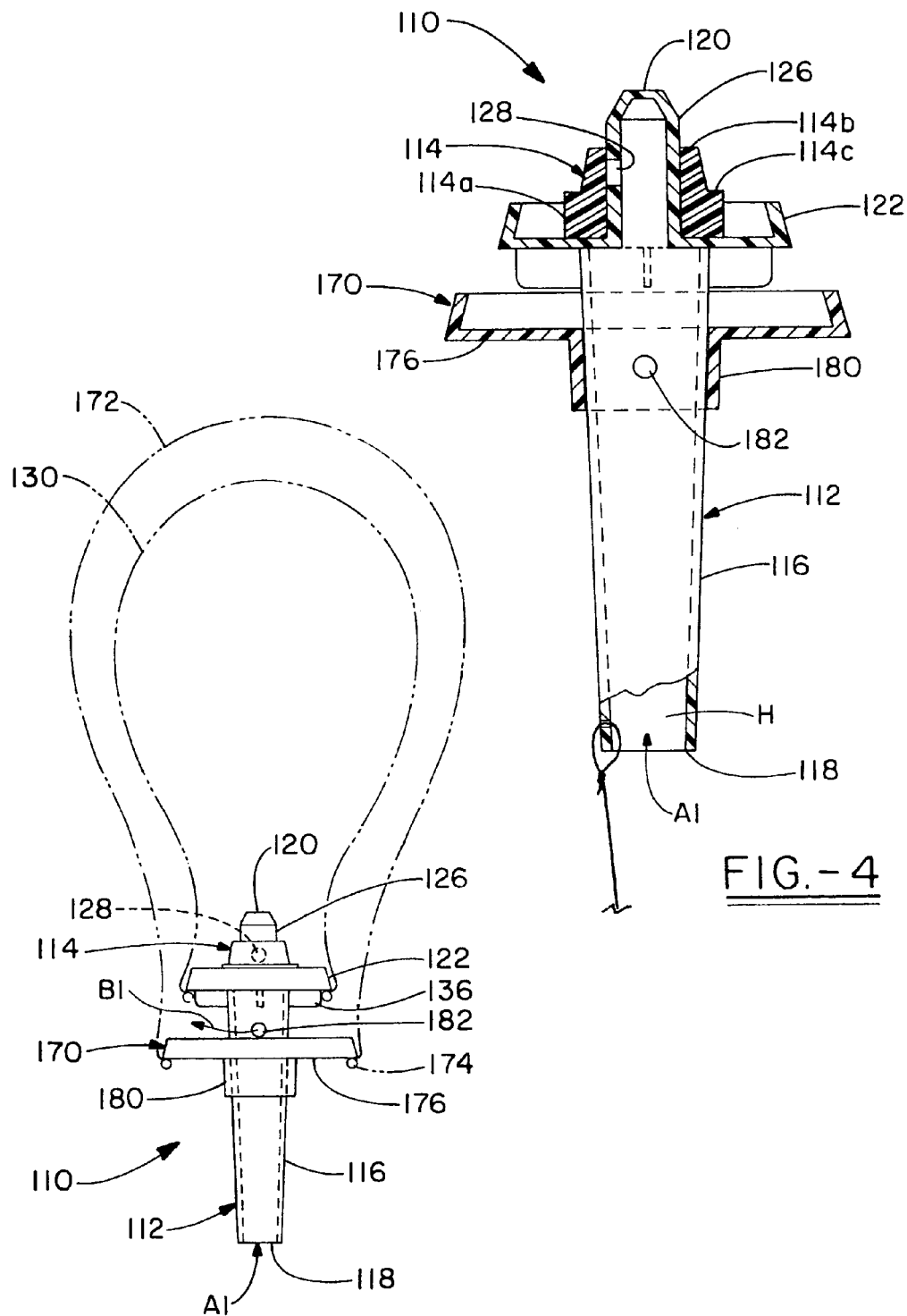
FIG. 3 is a side elevational view illustrating the application of the invention for inflation of a balloon-within-balloon display, the balloons being illustrated as uninflated.
FIG. 4 is a greatly enlarged elevational view, in partial section, illustrating the valve device of FIG. 3.

With reference to FIG. 1-2, it can be seen that a valve and retainer assembly according to this invention is designated generally by the numeral 10. Valve and retainer assembly 10 includes valve body 12, which, as will be described below, receives band valve 14. Valve body 12 includes stem 16, which is hollow as represented by the letter H in FIG. 2, from first end 18 to closed second end 20. Valve body 12 further includes retainer portion 22 that extends outwardly from stem 16. Retainer portion 22 includes radial shoulder 24, which extends radially outwardly from a position recessed from closed second end 20 of stem 16, thereby defining fill portion 26 of stem 16 as the portion of stem 16 that extends beyond radial shoulder 24 to closed second end 20. Although this invention is not to be so limited, it is preferred that valve body 12, including stem 16 and radial shoulder 24, be molded as a single component. Additionally, it is preferred that radial shoulder 24 be circular in cross-section inasmuch as it serves to retain a balloon, and a generally circular shape will serve to accommodate the circular cross-section shape of the neck and mouth of a balloon. The manner in which a balloon is affixed to valve and retainer assembly 10 will be particularly considered herein below.

With reference to FIGS. 1 and 2, it can be seen fill aperture 28 is provided in fill portion 26 to communicate with hollow H of stem 16. In the preferred embodiment of FIG. 2, only one fill aperture 28 is provided, but others could be provided, as, for example, by symmetrically spacing fill apertures offset at 180° or 90° in fill portion 26. A latex balloon 30 (shown in ghost lines) is affixed to valve and retainer assembly 10 simply by stretching neck portion 32 over radial shoulder 24 and securing the mouth 34, which is defined by a rolled portion of balloon material, thereunder. Notably, fill portion 26 and its fill aperture 28, surrounded by band valve 14, extend into the interior of balloon 30.

With reference to FIG. 2 it can be seen how band valve 14 operates as a one-way valve when filling a balloon 30 associated with valve and retainer assembly 10. Gas flowing in the direction of arrow A, from a pressurized source sealed to and entering at open end 18, will be forced out through fill aperture 28, because it serves as the only available exit from stem 16. The gas will push against band valve 14, at fill aperture 28, and band valve 14, due to its flexible nature, will be forced outward to allow gas to flow past fill aperture 28, between band valve 14 and the exterior of fill portion 26. The gas exiting in this manner will fill balloon 30. The resiliency of band valve 14 is such that it makes an adequate seal with fill aperture 28, regardless of back pressure from within the balloon.

Thus, when a balloon is affixed to valve and retainer assembly 10, gas may be introduced from a pressurized source, upwardly through stem 16, and the pressurized gas will open band valve 14, off of fill aperture 28, to allow the gas to fill the balloon. Once the balloon is filled, the pressurized gas source may be removed, and the resiliency of band valve 14 will seal band valve 14 on fill portion 26, over fill aperture 28, thereby maintaining the balloon in its filled state.

In another embodiment of this invention, the above valve, together with additional elements, is employed to provide a valve assembly useful for providing balloon-within-balloon displays. With reference to FIGS. 3 and 4, it can be seen that a multi-balloon valve and retainer assembly according to this invention is designated generally by the numeral 110. Like parts to valve and retainer assembly 10 receive like numerals, though increase by 100. Valve and retainer assembly 110 includes valve body 112, which includes stem portion 116, hollow from first end 118 to second end 120, as represented by the letter H in FIG. 4. Valve body 112 further includes retainer portion 122, with sealing shoulder 124 extending radially outwardly from a position recessed from closed second end 120 of stem 116, thereby defining fill portion 126 of stem 116. At least one first balloon fill aperture 128 is provided in fill portion 126 to communicate with hollow H of stem 116, and is covered and sealed with band valve 114. Although this invention is not to be so limited, it is preferred that valve body 112, including stem portion 116 and retainer portion 122, be molded as a single component, and that sealing shoulder 124 and retainer portion 122 be circular in cross-section. The manner in which a first balloon 130 is affixed to valve and retainer assembly 110 is the same as that described above with respect to the single-balloon embodiment of FIGS. 1 and 2.

For affixing a second balloon, valve and retainer assembly 110 further includes a slide disk 170, provided to receive a second balloon 172 that stretches over first balloon 130 to provide a balloon-within-balloon display. As with first balloon 130, a neck portion 174 of second balloon 172 is stretched over the peripheral shoulder 176 of slide disk 170 to secure the mouth under shoulder 176.

Slide disk 170 includes a seal sleeve 180 that intimately fits over stem portion 116 so that slide disk 170 may selectively slide along stem portion 116 to selectively cover or uncover second balloon fill aperture 182. In FIG. 1, one second balloon fill aperture 182 is provided, although it should be appreciated that multiple second balloon fill apertures could be provided. Second balloon fill apertures 182 extend through stem portion 116 below sealing shoulder 124 and into the hollow H of stem portion 116. Slide disk 170 is solid so that air may not pass through slide disk 70. In order to better seal second balloon fill aperture 182 and keep slide disk 170 secured to valve and retainer assembly 110, the inside diameter (ID) of seal sleeve 180 is slightly smaller than the outside diameter (OD) of stem portion 116 at the area proximate second balloon fill aperture 182. Additionally, stem portion 116 preferably tapers from first end 118 to the position of sealing shoulder 124, such that the OD of stem portion 116 grows larger from end 118 to shoulder 124. This will allow slide disk 170 to easily fit over stem portion 116, at end 118, while ensuring that seal sleeve 180 will adequately seal second balloon fill aperture 182 as it is advanced toward sealing shoulder 124. Although, this invention is not to be limited to any particular dimensions, the ID of seal sleeve 180 is approximately 0.005 inches smaller than the OD of stem portion 116 at the position of second balloon fill aperture 182, and stem portion 116 tapers from about 0.305" at open end 118 to about 0.345" at sealing shoulder 124, with the OD at fill aperture 182 at about 0.330".

When first balloon 130 and second balloon 172 are fixed to valve and retainer assembly 110, as shown in FIG. 3, valve and retainer assembly 110 may be employed to quickly fill such a balloon-within-balloon display. Particularly, slide disk 170 is manipulated so that seal sleeve 180 uncovers second balloon fill aperture 182 so that there is direct communication between the hollow of stem portion 116 and the interior of second balloon 172. In this position (FIG. 1), gas may be introduced through stem portion 116, as indicated at arrow A1, to enter second balloon 172 through second balloon fill aperture 182, as indicated at arrows B1. When second balloon fill aperture 182 is uncovered, gas introduced through the hollow of stem portion 116 will exit the hollow H at second balloon fill aperture 182, as this is the path of least resistance for the gas. Particularly, the gas will not force band valve 114 off of first balloon fill aperture 128 that communicates between the hollow H of stem portion 16 and the interior of first balloon 130. Thus, when second balloon fill aperture 182 are uncovered, second balloon 172 may be filled with air.

Once second balloon 172 has reached a desired size as a result of inflation, slide disk 170 is moved so that seal sleeve 180 covers second balloon fill aperture 182 in stem portion 116 (FIG. 2). Thereafter, gas introduced to the hollow H of stem portion 116 pushes against band valve 114, which operates as a one-way valve as already described in the embodiment of FIGS. 1 and 2.

In particularly preferred embodiments, the characteristics and properties of the band valve are important, and these aspects are disclosed here with respect to the embodiment of FIGS. 1 and 2 with the understanding that they also apply to the embodiment of FIGS. 3 and 4. First, in order to ensure that band valve 14 is secure on valve body 12, it is preferred that the ID of band valve 14 be slightly less than the OD of fill portion 26 of stem portion 16. This allows band valve 14 to be secure without the use of adhesives. FIG. 2 also shows that band valve 14 is preferable tapered, from a thick end 14A proximate radial shoulder 24, to a thin end 14B proximate and covering fill aperture 28. A step in thickness, as at lip 14C, can be configured into band valve 14 to further increase the material thickness at thick end 14A and strengthen the seal at that area. It has been found that this taper beneficially reduces the noise resulting from forcing air through stem 16 and past band valve 14 through aperture 28, particularly at the pressures employed in commercial balloon-filling pressurized air tanks and devices. It has been found that this band valve design allows fill air only to exit stem portion 16 at fill aperture 28 by forcing thin end 14B away from fill portion 26. The ID of thick end 14A remains in secure contact with fill portion 26. By forcing air into the balloon in this manner, the noise level is reduced because the flexible band valve 14 does not flap against fill portion 26 at various locations. It has also been found that it is desirable to have only one fill aperture 28, because introducing a second, while still providing a functionally acceptable valve assembly, resulted in loud noises during filling, as the valve 14 vibrated against the fill portion 26.

Without limitation, band valve 14 is preferably a thermoplastic elastomer. It is desirable to produce the valve body from a lightweight, yet suitably strong polymeric material, while producing the disk valve from an equally lightweight, yet flexible material that allows for inflation of a balloon through the introduction of a minimal pressure of gas through the stem.

Referring back to FIG. 2, it can been seen that radial shoulder 24 is strengthened by supporting ribs 36. Supporting ribs 36 lend rigidity to radial shoulder 24, and may optionally provide an area for attachment of a ribbon R1. More particularly, one of the supporting ribs 36 may include a slot 38, where ribbon R1 may be tied to the valve and retainer assembly 10. Alternatively, stem 16 of valve body 12 may optionally include slot 40, proximate first end 18. Slot 40 is provided for receiving a ribbon R2, particularly, for tying or heat sealing a ribbon R2 to stem 16. Slots 38 and/or 40 are particularly useful when valve and retainer assemblies 10 are to be employed with balloons that are to be filled with lighter-than-air gases, such as helium, because it is quite common to float lighter-than-air balloons on the end of ribbons. Notably, by providing slot 40 proximate first end 18, a combination balloon 30 and valve and retainer assembly 10 affixed to the ribbon R2 would orient itself in a substantially straight up-and-down manner, thereby maintaining the aesthetics of a typical lighter-than-air balloon in which the ribbon is tied directly to the neck of the balloon. In some valves of the prior art, the ribbon is stapled to the valve, which is believed to be more burdensome and costly than tying, and is more of a danger to children. Additionally, ribbons attached to valves of the prior art are affixed at a position that causes the balloon to offset from a substantially straight up-and-down orientation, and, in such an orientation, the balloon may tend to pull off of the valve and retainer assembly.

Stem 16, instead of receiving ribbons R1 or R2, might receive a balloon stick inserted at first end 18 into hollow H. The provision of balloon sticks in this manner is well known in the art.

It will be appreciated that, due to the simple configuration of valve and retainer assemblies according to this invention, very light valve and retainer assemblies may be manufactured simply by designing lightweight, thin wall valve body assemblies with valves that provide the desired utility and meet all applicable child safety standards for dimensional minimums. It is a feature of a particularly preferred valve and retainer assembly according to this invention to address all three criteria—light overall weight to increase float time, minimum size requirements to pass C.P.S.C (consumer products safety commission) "no-choke" child-safe tests, and provide a valve that quickly and reliably allows a balloon to be inflated and prevents gas loss therefrom.

It will be appreciated that the valve and retainer assembly 10 of this invention is easy to manufacture, assemble, and use. Indeed, it is contemplated that valve and retainer assemblies according to this invention would be provided in combination with uninflated balloons, as in FIG. 1 or 3, such that an end user would simply have to introduce pressurized gas through stem 16, as disclosed above, to inflate the balloons, without the need for tying the neck of any of the balloons. Such a provision of a combination balloon and valve and retainer assembly could amount to a significant reduction in the time and money spent to decorate an event, especially for special events in which a multitude of personalized balloons might be used to decorate the event. A ribbon R1 or R2 might be provided with the combination balloon and valve and retainer assemblies as shown in FIG. 1, and, ribbon R2 would be employed for balloon-within-balloon assemblies as in FIG. 3. When the balloons are to be filled with lighter-than-air gases, the provision of a ribbon as already tied to the valve and retainer assembly would help reduce decoration time to an even greater extent. Similarly, balloon sticks might also be provided with the combination balloon and valve and retainer assembly such that, upon inflation of the balloon, a balloon stick could simply be inserted into stem 16 to provide a balloon on the end of a stick.

In light of the foregoing, it should thus be evident that the process of the present invention, providing a valve and retainer assembly for latex balloons, substantially improves the art. While, in accordance with the patent statutes, only the preferred embodiments of the present invention have been described in detail herein above, the present invention is not to be limited thereto or thereby. Rather, the scope of the invention shall include all modifications and variations that fall within the scope of the attached claims.

What is claimed is:

1. A valve and retainer assembly for a balloon comprising:
a valve body including a stem that is hollow from an open first end to a closed second end thereof, and a radial shoulder extending outwardly from a position recessed from said second closed end of said stem, thereby defining a fill portion of said stem as the portion of said stem that extends beyond said radial shoulder to said closed second end, said fill portion including at least one fill aperture communicating with the hollow of said stem portion; and
a flexible band covering said at least one fill aperture of said fill portion, wherein said flexible band is tapered from a thick end, proximate said radial shoulder, to a thin end proximate said at least one fill aperture.

2. The valve and retainer assembly of claim 1, wherein gas pressure applied through said hollow of said stem flows against said flexible band at said at least one fill aperature and causes said flexible band to flex to allow gas to flow from said hollow of said stem outwardly through said at least one fill aperture.

3. The valve and retainer assembly of claim 1, wherein said stem portion includes a ribbon slot proximate said first end of said stem.

4. The valve and retainer assembly of claim 1, wherein said hollow of said stem portion is capable of receiving a balloon stick.

5. In combination, a balloon and a valve and retainer assembly for a balloon comprising:
a balloon including a neck portion having a mouth defined by a rolled portion of balloon material; and
a valve and retainer assembly including:
a valve body having a stem that is hollow from an open first end to a closed second end thereof, and a radial shoulder extending outwardly from a position recessed from said second end of said stem, thereby defining a fill portion of said stem as the portion of said stem that extends beyond said radial shoulder to said closed second end, said fill portion including at least one fill aperture communicating with the hollow of said stem portion;
a flexible band covering said at least one fill aperture of said fill portion, wherein said rolled portion of balloon material defining said mouth is received around said radial shoulder such that said fill portion extends into the interior of said balloon;
at least one second balloon fill aperture extending through said stem portion below said sealing shoulder and into the hollow of said stem portion; and
a slide disk having a seal sleeve that intimately fits over said stem portion, such that said slide disk selectively slides along said stem portion so that said seal sleeve can selectively cover said at least one second balloon fill aperture.

6. The combination of claim 5, wherein said stem of said valve and retainer assembly includes a ribbon slot proximate said first end of said stem.

7. The combination of claim 6, further comprising a ribbon affixed to said ribbon slot.

8. The combination of claim 5, wherein said hollow of said stem portion is capable of receiving a balloon stick.

9. The combination of claim 5, wherein said balloon is deflated and may be inflated by introducing gas upwardly through said hollow of said stem portion, from said open first end toward said closed second end thereof such that said flexible band is displaced from covering said at least one fill aperture so that the gas enters said balloon through said at least one fill aperture.

10. The combination of claim 5, further comprising a second balloon including a neck portion having a mouth defined by a rolled portion of balloon material, wherein said rolled portion of balloon material defining said mouth of said second balloon is received around said slide disk such that said balloon of claim 6 extends into the interior of said second balloon.

* * * * *